(12) United States Patent
Mihalakis

(10) Patent No.: US 7,320,521 B2
(45) Date of Patent: Jan. 22, 2008

(54) OPTICAL ENGINE ARCHITECTURES

(75) Inventor: George M. Mihalakis, San Jose, CA (US)

(73) Assignee: Next Wave Optics, Inc., San Jose, CA (US)

( * ) Notice: Subject to any disclaimer, the term of this patent is extended or adjusted under 35 U.S.C. 154(b) by 269 days.

(21) Appl. No.: 11/174,714

(22) Filed: Jul. 5, 2005

(65) Prior Publication Data
US 2006/0007539 A1  Jan. 12, 2006

Related U.S. Application Data

(60) Provisional application No. 60/587,160, filed on Jul. 12, 2004.

(51) Int. Cl.
G03B 21/14 (2006.01)
G03B 21/28 (2006.01)
G02F 1/00 (2006.01)
G02B 5/30 (2006.01)
G02B 27/28 (2006.01)

(52) U.S. Cl. .................... 353/20; 353/33; 353/34; 353/37; 353/81; 353/98; 359/495; 348/750; 348/758

(58) Field of Classification Search ............... 353/20, 353/31, 33, 34, 37, 81; 349/9; 348/750, 348/758; 359/20, 31, 33, 34, 37, 81, 98, 359/495
See application file for complete search history.

(56) References Cited

U.S. PATENT DOCUMENTS

| 4,739,396 | A | 4/1988 | Hyatt | 358/60 |
|---|---|---|---|---|
| 4,796,978 | A | 1/1989 | Tanaka et al. | 350/337 |
| 4,864,390 | A | 9/1989 | McKechnie et al. | 358/60 |
| 4,935,656 | A | 6/1990 | Kawamura | 310/156 |
| 4,962,997 | A | 10/1990 | Baldwin | 350/172 |
| 4,983,032 | A | 1/1991 | Van Den Brandt | 353/30 |
| 4,989,076 | A | 1/1991 | Owada et al. | 358/61 |
| 5,012,274 | A | 4/1991 | Dolgoff | 340/702 |
| 5,022,750 | A | 6/1991 | Flasck | 353/31 |
| 5,024,524 | A | 6/1991 | Flasck | 353/31 |
| 5,028,121 | A | 7/1991 | Baur et al. | 350/351 R |
| 5,042,929 | A | 8/1991 | Tanaka et al. | 359/708 |
| 5,060,058 | A | 10/1991 | Goldenberg et al. | 358/60 |

(Continued)

FOREIGN PATENT DOCUMENTS

EP  0710 036 A2  5/1996

(Continued)

OTHER PUBLICATIONS

International Search Report; Jul. 7, 2003.

*Primary Examiner*—Melissa Jan Koval
(74) *Attorney, Agent, or Firm*—Orrick Herrington & Sutcliffe, LLP

(57) ABSTRACT

An optical engine architecture that operates as either a two-imager or a three-imager optical engine. The optical engine uses a first PBS cube and a second PBS cube having an optical axis between them. In between the first PBS cube and second PBS cube are two quarter wave plates and a dichroic mirror, where the dichroic mirror is disposed between the two quarter wave plates. In the three imager embodiment, a retarder is disposed between the second PBS cube and the quarter wave plate closest to the second PBS cube. In the two imager embodiment, this retarder is not necessary.

34 Claims, 13 Drawing Sheets

U.S. PATENT DOCUMENTS

| | | | |
|---|---|---|---|
| 5,075,798 A | 12/1991 | Sonehara et al. | 359/490 |
| 5,097,323 A | 3/1992 | Sato et al. | 358/60 |
| 5,098,183 A | 3/1992 | Sonehara | 353/31 |
| 5,105,265 A | 4/1992 | Sato et al. | 358/60 |
| 5,108,172 A | 4/1992 | Flasck | 353/31 |
| 5,115,305 A | 5/1992 | Bauer et al. | 358/60 |
| 5,181,054 A | 1/1993 | Nicolas et al. | 353/20 |
| 5,231,431 A | 7/1993 | Yano et al. | 353/31 |
| 5,239,322 A | 8/1993 | Takanashi et al. | 353/31 |
| 5,245,449 A | 9/1993 | Ooi et al. | 359/40 |
| 5,321,448 A | 6/1994 | Ogawa | 353/34 |
| 5,327,270 A | 7/1994 | Miyatake | 359/63 |
| 5,386,306 A | 1/1995 | Ginjina et al. | 359/52 |
| 5,390,048 A | 2/1995 | Miyatake et al. | 359/650 |
| 5,400,180 A | 3/1995 | Chung | 359/634 |
| 5,420,655 A | 5/1995 | Shimizu | 353/33 |
| 5,459,539 A | 10/1995 | Yamamoto | 353/119 |
| 5,467,146 A | 11/1995 | Huang et al. | 348/743 |
| 5,486,881 A | 1/1996 | Huang | 353/34 |
| 5,577,826 A | 11/1996 | Kasama et al. | 353/31 |
| 5,748,376 A | 5/1998 | Lin et al. | 359/629 |
| 5,777,789 A | 7/1998 | Chiu et al. | 359/494 |
| 5,798,819 A | 8/1998 | Hattori et al. | 353/33 |
| 5,815,221 A | 9/1998 | Kojima et al. | 348/751 |
| 5,829,855 A | 11/1998 | Uchiyama | 353/74 |
| 5,835,661 A | 11/1998 | Tai et al. | 385/146 |
| 6,034,818 A | 3/2000 | Sedlmayr | 359/497 |
| 6,046,858 A | 4/2000 | Scott et al. | 359/634 |
| 6,053,615 A | 4/2000 | Peterson et al. | 353/20 |
| 6,082,861 A | 7/2000 | Dove et al. | 353/20 |
| 6,089,719 A | 7/2000 | Lin | 353/33 |
| 6,113,239 A | 9/2000 | Sampsell et al. | 353/31 |
| 6,139,156 A | 10/2000 | Okamori et al. | 353/98 |
| 6,174,060 B1 | 1/2001 | Imaoka et al. | 353/31 |
| 6,176,586 B1 | 1/2001 | Hirose et al. | 353/31 |
| 6,183,090 B1 | 2/2001 | Nakanishi et al. | 353/20 |
| 6,183,091 B1 | 2/2001 | Johnson et al. | 353/20 |
| 6,375,330 B1 | 4/2002 | Mihalakis | 353/31 |
| 6,419,362 B1 | 7/2002 | Ikeda et al. | 353/20 |
| 6,454,416 B2 | 9/2002 | Aoto et al. | 353/31 |
| 7,111,942 B2 * | 9/2006 | Hirata et al. | 353/33 |
| 2002/0001135 A1 | 1/2002 | Berman et al. | 359/640 |
| 2002/0089679 A1 | 7/2002 | Yi et al. | 358/1.9 |
| 2002/0176054 A1 | 11/2002 | Mhalakis | 351/31 |

FOREIGN PATENT DOCUMENTS

| | | |
|---|---|---|
| WO | WO 01/50178 | 7/2001 |

* cited by examiner

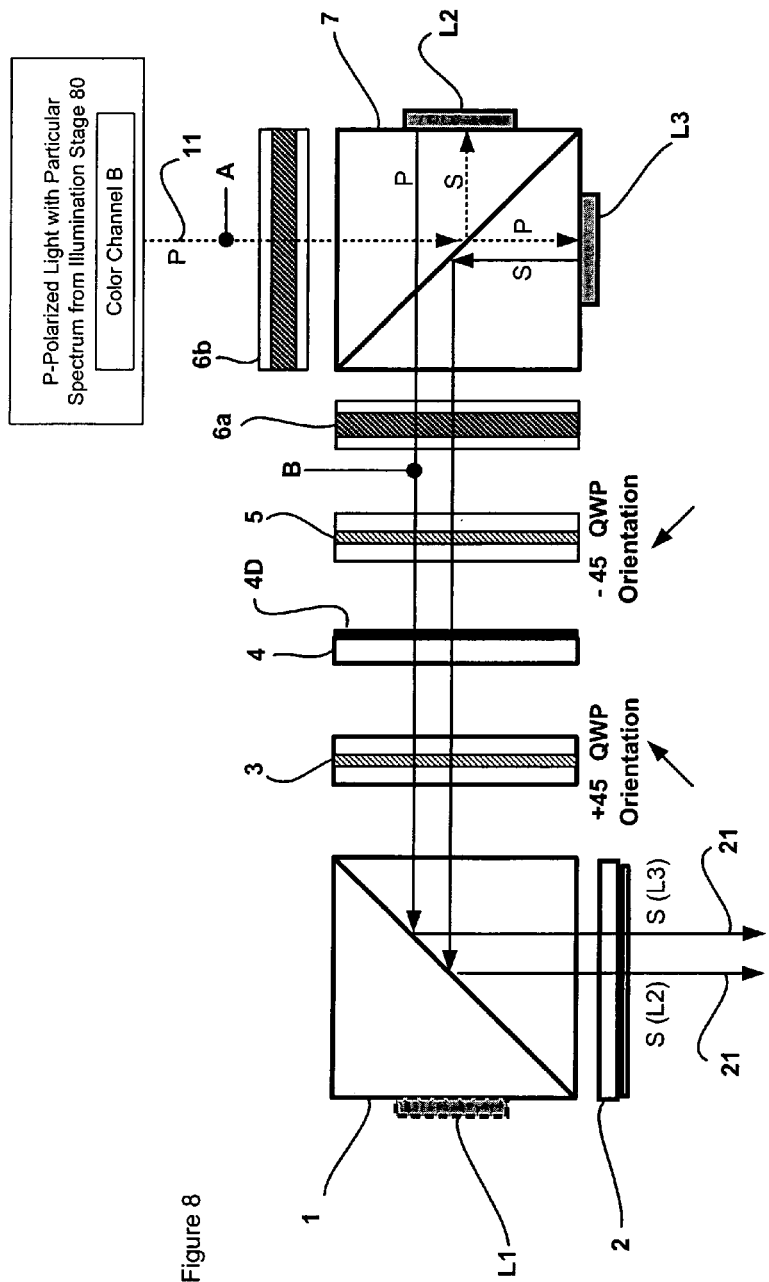

Figure 10

Possible 3-Imager Color Logic Arrangements

| Dichroic 16 Transmission Channel A | Dichroic 18 Transmission Channel B | Dichroic 4D Transmission Barrier | Imager L1 Color | Imager L2 Color | Imager L3 Color |
|---|---|---|---|---|---|
| Green | Magenta | Magenta | Green | Red | Blue |
| Green | Magenta | Magenta | Green | Blue | Red |
| Red | Cyan | Cyan | Red | Green | Blue |
| Red | Cyan | Cyan | Red | Blue | Green |
| Blue | Yellow | Yellow | Blue | Green | Red |
| Blue | Yellow | Yellow | Blue | Red | Green |

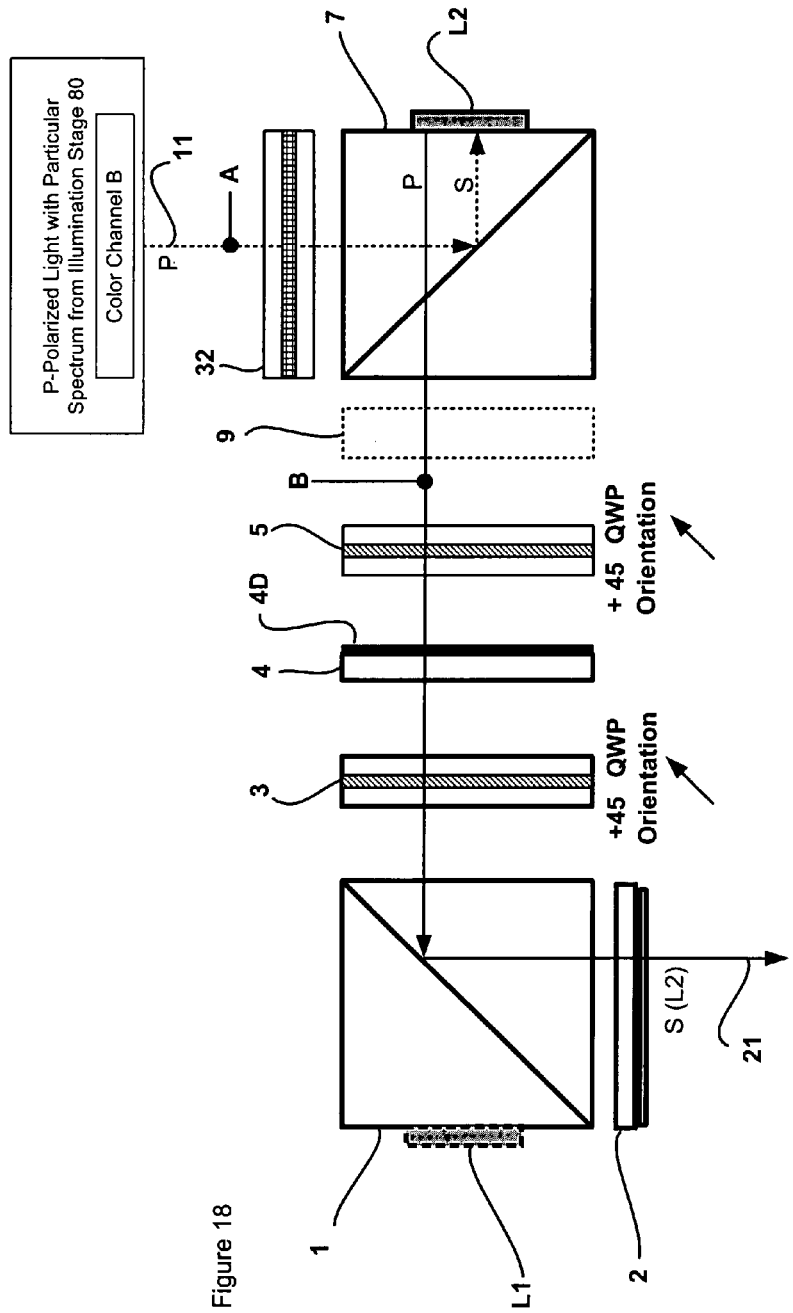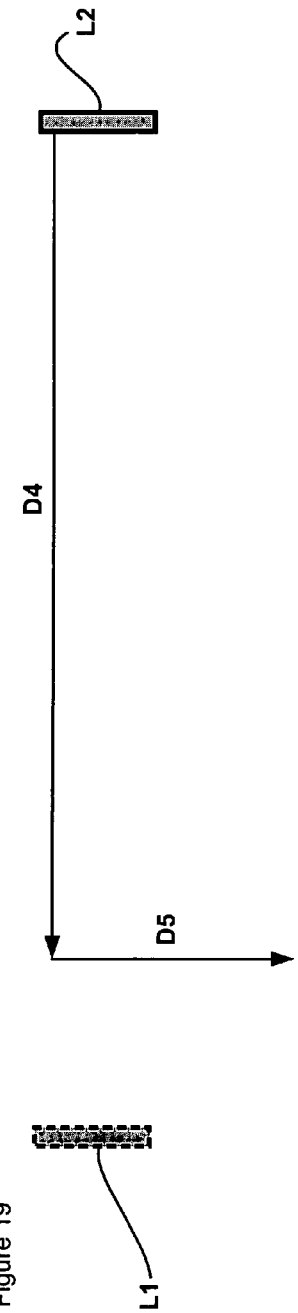
Figure 18
Figure 19

Figure 20

Possible 2-Imager Color Logic Arrangements

| Dichroic 16 Transmission Channel A | Dichroic 18 Transmission Channel B | Dichroic 4D Transmisssion Barrier | Imager L1 Color | Imager L2 Color |
|---|---|---|---|---|
| Red | Cyan | Cyan | Red | Green / Blue |
| Green | Magenta | Magenta | Green | Red / Blue |
| Blue | Yellow | Yellow | Blue | Red / Green |

Figure 23

Preferred Embodiment and Alternate Polarization Logic Examples

| | Illum Output Channel A | Illum Output Channel B | PBS 1 In | PBS 1 1st Out | Film Pol 2 Out | PBS 7 In | PBS 7 Out | Imager L1 In | Imager L2 In |
|---|---|---|---|---|---|---|---|---|---|
| Preferred Embodiment | S | P | S | P | S | S | P | S | S |
| Alternate Example 1 | P | P | P | S | P | P | S | S | P |
| Alternate Example 2 | S | S | S | P | S | P | S | S | P |

OPTICAL ENGINE ARCHITECTURES

CROSS-REFERENCE TO RELATED APPLICATIONS

This application claims priority to U.S. Provisional Application Ser. No. 60/587,160, filed on Jul. 12, 2004. Priority to this prior application is expressly claimed, and the disclosure is hereby incorporated by reference in its entirety.

FIELD

The present application relates generally to rear-projection television (RPTV) systems, computer monitor and portable data display systems, and more particularly to electronic image projector engines. More particularly, the present application relates to projection engines which enable the use of reflective liquid-crystal-on-silicon semiconductor light valve imaging devices, commonly referred to as liquid-crystal-on-silicon imagers.

BACKGROUND

Consumers have started to acquire high definition televisions, often referred to as "HDTV". One type of HDTV is the rear projection television system, or "RPTV". Traditional RPTVs use either cathode ray tubes that project picture data onto the rear of a transmission screen or microdisplay technologies that form images through the use of solid state "imagers" in conjunction with a light engine that in turn project images onto the rear of the transmission screen. The term "imager" is often used in the trade as formal nomenclature for the term "microdisplay."

One type of microdisplay imagers are reflective liquid-crystal-on-silicon devices, known as "LCoS". For LCoS imagers to be useful in display systems, a projection engine optical architecture having high performance and low cost is necessary. A 'projection engine' or "light engine" generally refers to the components of a display from lamp to the projection lens. The various embodiments disclosed herein teach disclose a projection engine architecture capable of high performance and low cost, both of which are requirements in the competitive display market.

All projection engine architectures must perform the following functions. The engine must collect, condense and condition raw bulb light emission for illumination of the imager devices. Then, the engine must separate the white light from the lamp into three primary colors (red, green and blue), polarize each color appropriately for presentation to the LCoS imagers. The engine must then analyze polarization of the modulated primary images after reflection from the LCoS imagers, and then combine the primary colors through a projection lens that focuses the combined image onto the screen.

A primary property of LCoS imagers is polarization of light. The degree to which polarization is processed and transformed within the projection engine is of paramount importance to its total image performance. Polarization is commonly resolved into two opposite spatial components, "P" and "S". A vector quantity pertinent to this polarization property is the "polarization state" of a particular beam of light. The polarization states of interest are "P-polarization", which is the alignment of the polarization vector with the electric field vector of the light waves, and "S-polarization", which is the polarization vector perpendicular to the electric field vector of the light waves. As used herein, polarization logic means that a polarization vector pointing in any direction of the compass about the optical axis can be resolved into its two constituent components in the S direction or the P direction. The quality of the contrast in the engine polarization states is directly converted into luminance contrast in the image, which the viewer sees as the full black and full white states of the image. Thus, high contrast between P-polarization and S-polarization is necessary for high image quality.

There continues to be a need for a low cost, high performance, optical engine for use in rear projection displays having improved performance and lower cost than those of the prior art.

SUMMARY

A new type of projection engine architecture for use in projection displays is disclosed. In one embodiment, an optical engine is disclosed having a first PBS cube having a first beamsplitting hypotenuse that reflects first polarization state light beams and transmits second polarization state light beams. This first PBS cube has a first face that receives first polarization state, first color spectrum light beams transmitted along a first optical axis. A first imaging device is placed at a second face of the first PBS cube, which receives first color spectrum, first polarization state light beams reflected by the first beamsplitting hypotenuse. This first imaging device reflects first color spectrum, second polarization state light beams having pixel information along a second optical axis. The first optical axis and the second optical axis are perpendicular to each other. A first quarter-wave plate resides in a plane perpendicular to the second optical axis. The first quarter-wave plate provides half of the phase retardance required for a complete switch of polarization state for polarized light beams passing therethrough along the second optical axis. The first quarter wave plate also provides another half phase retardance resulting in a complete switch of polarization state for polarized beams returning therethrough upon reflection from a dichroic mirror. The dichroic mirror resides in a plane perpendicular to the second optical axis and has a first face and a second face. The first face of the dichroic mirror faces the first quarter-wave plate. The dichroic mirror reflects light having the first color spectrum and transmits light having a second color spectrum. A second quarter-wave plate resides in a plane perpendicular to the second optical axis and removes half the phase retardance required for a complete switch of polarization state for polarized light beams passing therethrough along the second optical axis. The dichroic mirror resides in between the second quarter-wave plate and the first quarter-wave plate. A film polarizer is disposed at a third face of the first PBS cube and perpendicular to the first optical axis. The film polarizer transmits light beams having the first polarization state and absorbing light beams having the second polarization state.

In another embodiment, the optical engine has a projection lens that receives the output of the film polarizer.

In preferred embodiments, a first light beam reflected by the first imaging device, passing through the first beamsplitting hypotenuse, transmitted through the first quarter-wave plate in a first direction along the second optical axis, reflected back towards the first quarter-wave plate by the dichroic mirror in a second direction along the second optical axis, transmitted back through the first quarter-wave plate, transmitted back into the first PBS cube, reflected by the first beamsplitting hypotenuse towards the third face of the first PBS cube, and transmitted through the film polarizer to the projection lens has a first path length.

In another embodiment, the optical engine also has a first wavelength selective retarder that receives second polarization state, second color spectrum light beams transmitted along a third optical axis. The first wavelength selective retarder is perpendicular to the third optical axis and switches a portion of the second color spectrum to the first polarization state. The engine also has a second PBS cube having a first face in a plane perpendicular to the third optical axis. The second PBS cube has a second beamsplitting hypotenuse that reflects light beams having the first polarization state and transmits light beams having the second polarization state. This embodiment also has a second imaging device placed at a second face of the second PBS cube for receiving first polarization state light beams reflected by the second beamsplitting hypotenuse. The second face of the second PBS cube is perpendicular to the first face of the second PBS cube. The second imaging device reflects second polarization state light beams having pixel information along the second optical axis. A third imaging device is placed at a third face of the second PBS cube that receives the second polarization state light beams transmitted by the second beamsplitting hypotenuse and reflects first polarization state light beams having pixel information along the third optical axis. A second wavelength selective retarder is placed at a fourth face of the second PBS cube such that the second wavelength selective retarder is placed in between the second PBS cube and the second quarter-wave plate.

In preferred embodiments, a second light beam reflected by the second imaging device along the second optical axis, passing through the second beamsplitting hypotenuse, transmitted by the second wavelength selective retarder, transmitted through the second quarter-wave retarder, transmitted through the dichroic mirror, transmitted through the first quarter-wave plate, transmitted into the first PBS cube, reflected by the first beamsplitting hypotenuse towards a third face of the first PBS cube, and transmitted through the film polarizer to the projection lens has a second path length. The second path length is substantially identical to the first path length.

Likewise, a third light beam reflected by the third imaging device along the third optical axis, reflected by the second beamsplitting hypotenuse along the second optical axis in a direction opposite the second imaging device, transmitted by the second wavelength selective retarder, transmitted through the second quarter-wave retarder, transmitted through the dichroic mirror, transmitted through the first quarter-wave plate, transmitted into the first PBS cube, reflected by the first beamsplitting hypotenuse towards the third face of the first PBS cube, and transmitted through the film polarizer to the projection lens has a third path length. In preferred embodiments, the third path length is substantially identical to the first path length.

In yet another embodiment, the optical engine comprises a half-wave plate that receives second polarization state, second color spectrum light beams transmitted along a third optical axis. The half-wave plate is perpendicular to the third optical axis and switches second polarization state light beams to the first polarization state. This embodiment has a second PBS cube having a first face in a plane perpendicular to the third optical axis and having a second beamsplitting hypotenuse that reflects light beams having the first polarization state and transmits light beams having the second polarization state. The second PBS cube is arranged such that it is adjacent to the second quarter-wave plate. This embodiment also comprises a second imaging device placed at a second face of the second PBS cube for receiving first polarization state light beams reflected by the second beamsplitting hypotenuse. The second face of the second PBS cube is perpendicular to the first face of the second PBS cube. The second imaging device reflects second polarization state light beams having pixel information along the second optical axis.

In an embodiment, a second light beam reflected by the second imaging device along the second optical axis, passing through the second beamsplitting hypotenuse, transmitted through the second quarter-wave retarder, transmitted through the dichroic mirror, transmitted through the first quarter-wave plate, transmitted into the first PBS cube, reflected by the first beamsplitting hypotenuse towards the third face of the first PBS cube, and transmitted through the film polarizer to the projection lens has a second path length. The second path length is preferably identical to the first path length.

In an embodiment, an optical spacer device can be placed in between the second PBS cube and the second quarter-wave plate wherein the optical spacer device is sized to ensure that the second path length is substantially identical to the first path length.

In various embodiments, the first color spectrum comprises a primary color spectrum and the second color spectrum comprises a supplemental color spectrum. The supplemental color spectrum comprises those color wavelengths not included in the primary color spectrum.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments

BRIEF DESCRIPTION OF THE DRAWINGS

FIG. 8 details the polarization logic paths of Color Channel B operating along the same axis as the two special arrangements 49 and 50.

FIG. 9 dimensions the complete and total optical path lengths of the Color Channel B imagers L2 and L3 on the single axis constructed by juxtaposition of the two component arrangements 49 and 50 as defined in the three-imager engine.

FIG. 10 is a table of color logic arrangements for a three-imager imaging stage.

FIG. 18 details the polarization logic paths of Color Channel B operating along the same axis as the two arrangements 49 and 50.

FIG. 19 dimensions the complete and total optical path lengths of the Color Channel B imager L2 on the single axis constructed by juxtaposition of the two component arrangements 49 and 50 as defined in the two-imager engine.

FIG. 20 is a table of color logic arrangements for a three-imager imaging stage.

FIG. 23 lists polarization logic of a preferred embodiment along with two other examples of alternate polarization logic.

Figure 1:
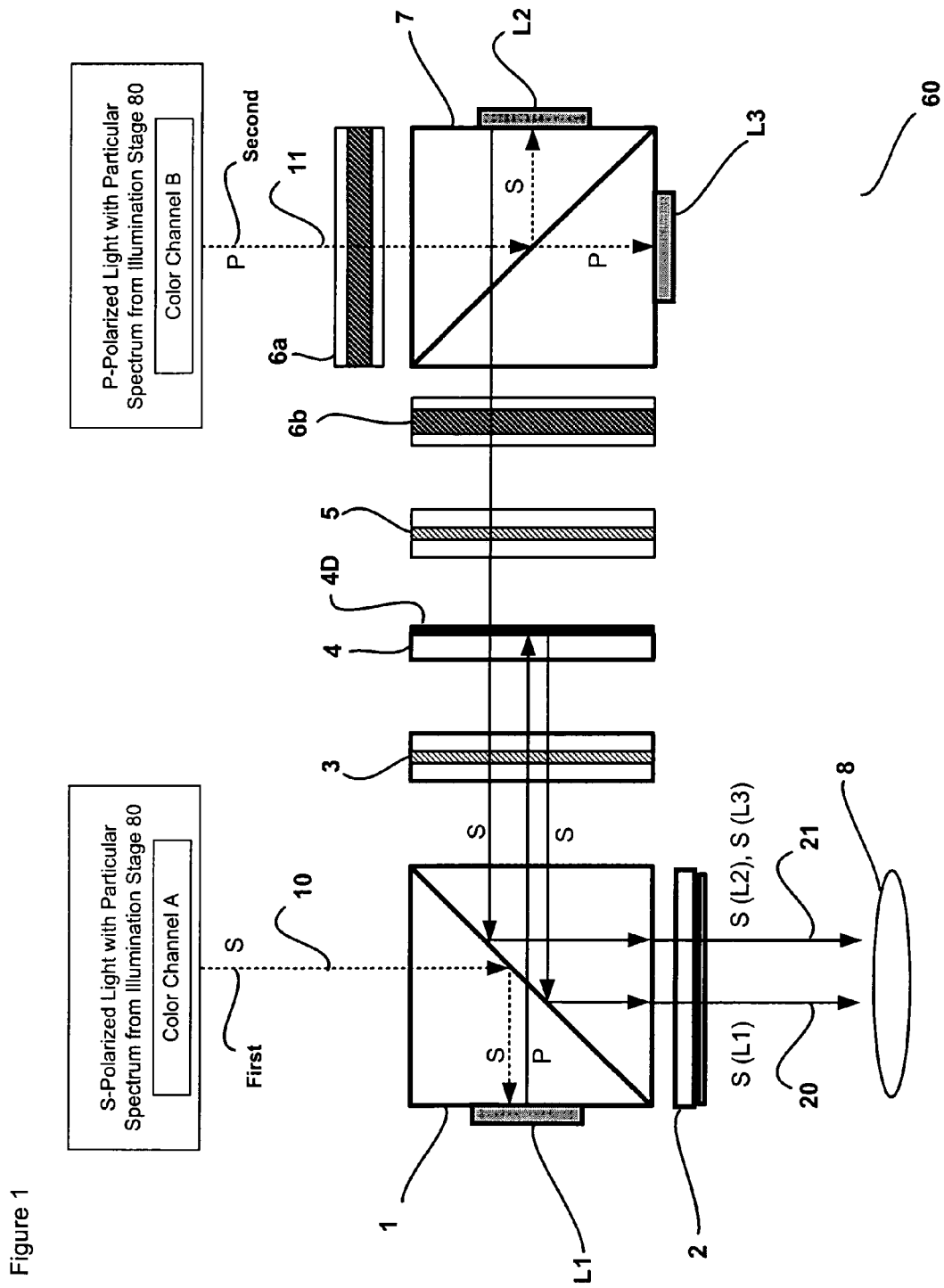
FIG. 1 depicts a three-imager imaging stage design 60 showing illumination stage 80, inputs 10 and 11, outputs 20 and 21, and basic polarization logic paths (S polarization and P polarization).

It should be noted that the figures are not drawn to scale and that elements of similar structures or functions are generally represented by like reference numerals for illustrative purposes throughout the figures. It also should be noted that the figures are only intended to facilitate the description of the preferred embodiments.

DETAILED DESCRIPTION OF THE DRAWINGS

Turning to the figures, the presently preferred apparatus and methods will now be described. FIGS. 1-10 depict a three-imager microdisplay imaging stage assemblage for use with LCoS imagers. Referring to FIG. 1, the imaging stage 60 for the three-imager microdisplay design is illustrated and shows illumination stage inputs 10 and 11, outputs 20 and 21, and basic polarization logic paths (S polarization and P polarization). FIG. 1 also illustrates via text boxes labeled Color Channel A and Color Channel B, two separate and distinct color channel outputs from a dual illumination stage (described below with respect to FIG. 21) such that each has supplementary color spectra to the other. For example, if Color Channel A beam 10 originating from the illumination stage 80 is chosen to be green, then Color Channel B beam 11 shall provide the supplemental (or remaining) visible spectra, which is magenta. Alternatively, if Color Channel A is chosen to be red, then Color Channel B shall provide the remaining visible spectra, which is cyan. The complete table of color supplements from the dual illuminator beams is shown as a table in FIG. 10. These separate light input beams 10 and 11 incident to the three-imager imaging stage 60 are also of opposite linear polarization such that Color Channel A delivers S polarized light and Color Channel B delivers P polarized light.

The three-imager imaging stage 60 is preferably embodied via two unique component arrangements. The first such arrangement involves polarizing beam splitter cube ("PBS") 1, film polarizer 2, quarter-wave plate ("QWP") 3 and dichroic mirror 4 acting as a portion of the imaging stage, while the second arrangement involves components QWP 3, dichroic mirror 4 and QWP 5 acting as another subset of the imaging stage. Together with an arrangement of components retarder 6a, 6b and PBS cube 7, a complete three-imager LCoS imaging stage is embodied that uniquely operates along a single axis subtended between imager components L1 and L2 that are substantially facing each other across the extent of the stage.

As discussed, LCoS imagers are polarization modulating devices. Thus, polarization beamsplitter cubes, or PBS cubes, are used. A PBS cube is a cubical optical prism which separates or resolves light into the two primary polarization states, called the "components of polarization." These two components of polarization are the "P" polarization state and the "S" polarization state discussed above. In general, a PBS cube is constructed by cementing together the hypotenuse faces of two glass forty-five degree triangular prisms. A suitable dielectric thin films is coated between the hypotenuse faces to affect the separation at the combined hypotenuse by reflecting one polarization state while transmitting the other. The manner in which PBS cubes operate is well known. However, a basic description is as follows. Light incident to the PBS cube is separated along two distinct axes ninety degrees apart. The P polarized light is transmitted through the hypotenuse while the S polarized light is reflected off of the hypotenuse. It is in this manner that PBS cubes operate.

Figure 2:
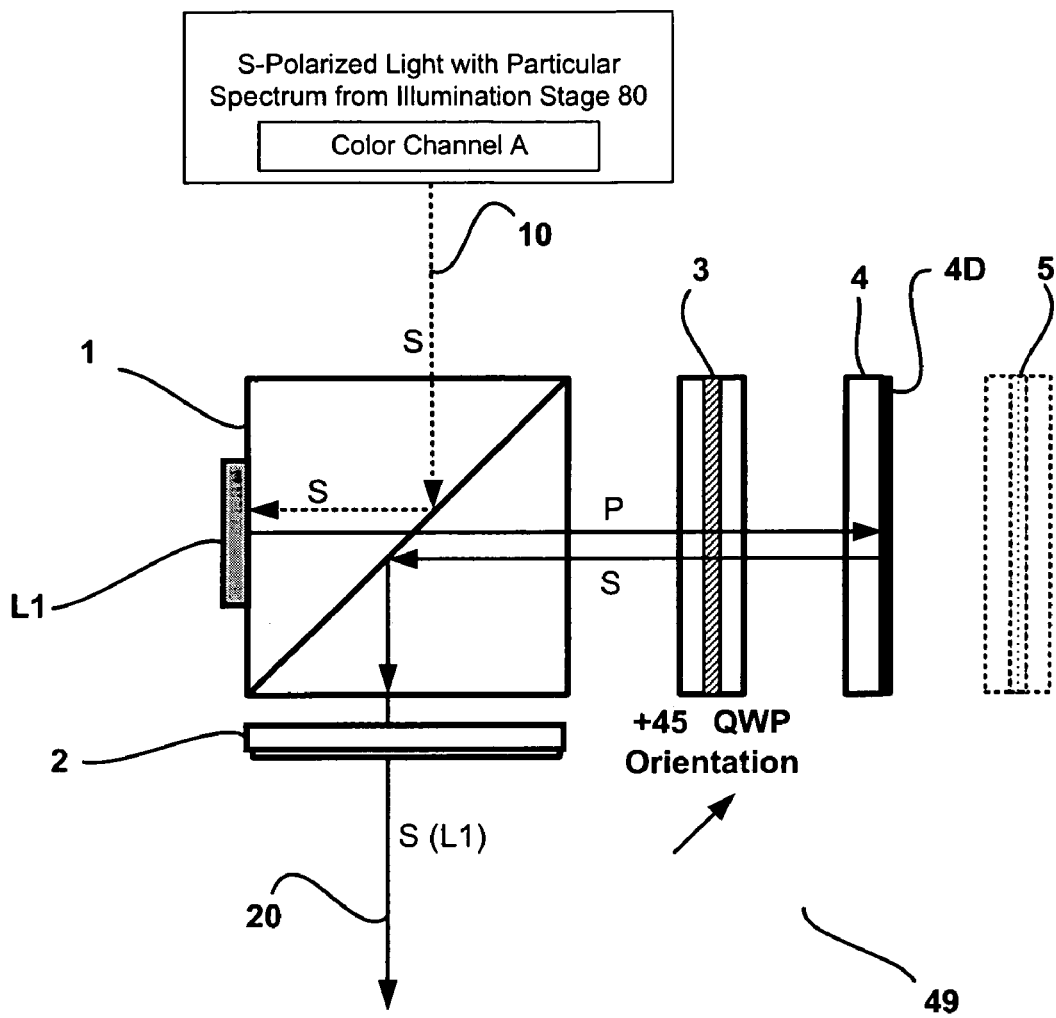
FIG. 2 details the first of the two component arrangements for the three-imager imaging stage. This first arrangement 49 processes only the light input 10 entering Color Channel A.

FIG. 2 discloses an arrangement of components comprising the first assemblage 49 of the complete imaging stage 60. LCoS imager L1 is positioned on a particular side of PBS cube 1 as shown. LCoS imager L1 is preferably arranged so that its active area is placed along the same axis as LCoS imager L2 (see e.g., FIG. 1). An input beam 10 from color channel A comprising S polarized light of a particular primary color spectrum enters polarization beam splitter (PBS) 1. Input beam 10 should be suitable to adequately illuminate the active area of LCoS imager L1. When input beam 10, which as discussed comprises S polarized light, enters PBS cube 10, it is reflected off of the hypotenuse of PBS cube 1 so that it falls incident upon LCoS imager L1. LCoS imagers switch the polarization of light incident upon them. Thus, when S polarized light reflected from they hypotenuse of PBS cube 1 strikes LCoS imager L1, it reflects P polarized light comprising the projected image content. Since the light beam reflected by LCoS imager L1 has P polarization, it is transmitted through the hypotenuse of PBS cube 1, falling incident upon quarter-wave plate (QWP) 3. QWP 3 is oriented with its fast axis at +45° to the vertical polarization axis of the beam, thereby providing only half the phase retardance required to switch the linear polarization beam 10 passing through it. After exiting QWP 3, beam 10 then encounters dichroic mirror 4, which is preferably coated with dichroic thin film transmission spectrum formula 4D.

Dichroic mirror thin film coating 4D on dichroic mirror 4 reflects the complete color spectrum found in Color Channel A and transmits the complete spectrum found in Color Channel B. Since dichroic mirror 4 is positioned at 0° to the incident beam, its performance in separating the transmission and reflection color bands can be very precise and independent of polarization state.

Upon retro-reflection from dichroic mirror 4, the complete Color Channel A waveband contained in beam 10 returns to PBS cube 1 via a second transmission through QWP 3. Its +45° orientation adds the second half of the phase retardance suitable to switch the linear polarization from P back to S so that when beam 10 returns to PBS cube 1, it now reflects off the hypotenuse as S polarized output beam 20. Aligned with S polarization output beam 20 is film polarizer 2, the function of which is to trim unwanted P state pollution in the S output, essentially "cleaning up" the pure S polarization in the image from imager L1.

Fundamental to the advantages of the retro-reflective arrangement of components comprising the first assemblage 49 is that assemblage 49 accomplishes the double use of a single PBS component as if there were two physical PBS components acting sequentially. The sequential use of groups of two PBS components situated among intersections of two or more optical axes is found repeatedly in the prior art. The unique arrangement of components for the three-imager assemblage 49 disclosed herein achieves the optical action of multiple PBS components with only a single PBS along a single optical axis. This provides a tremendous advantage over prior art engines in both performance and cost.

As shown in FIG. 2, these gains are in part due to the unique property of color channel assemblage 49 wherein single PBS prism 1, used in this manner as both polarizer and analyzer in retro-reflective mode via retro-reflective polarization switch comprised of quarter wave retarder 3 and dichroic mirror 4. Arrangement 49 removes from output beam 20 by cancellation, polarization rotation deficiencies caused by less than ideal dielectric thin film stack phenomena that produce variations in retardance values vs. ray angle, as well as further retardance value variations caused by local imperfections across its area caused by deposition accuracy. Since high projected image contrast very much depends on the polarization purity switched in the PBS prism polarization—for example, to one part in one thousand for a 1000:1 contrast ratio in the projected image—the function of single polarizer PBS 1 within arrangement 49 is critical to the improved performance. After reflection from imager L1, P polarized light first interacts with PBS 1 as a polarizing component in transmission, where the PBS 1 dielectric retardance imperfections are effected or "encoded" onto the beam's polarization structure. Upon retro-refection from dichroic mirror 4 and twice through quarter wave retarder 3, S polarized light is returned where it now interacts with PBS 1 a second time, now as an analyzer component before becoming output beam 20. In these equal and opposite path interactions, the retardance imperfections caused by PBS prism 1 are nulled substantially better than is possible with two different and consecutive polarizer prisms acting in series. This function works precisely the same way in the 2-Imager variation of the engine.

Another unique benefit of assemblage 49 is its use of a double optical path length between imager L1 and output beam 20. By doing so, the optical path length between imager L1 and output beam 20 can be exactly equal to the optical path length between imager L2 and output beam 20, and imager L3 and output beam 20, both of which traverse two PBS elements. Equal optical path length between each imager and its output is vital to operation, image congruity and convergence. The requirement is fundamental and well understood in the art, calculated by knowing the index of refraction of each component material.

Figure 3:
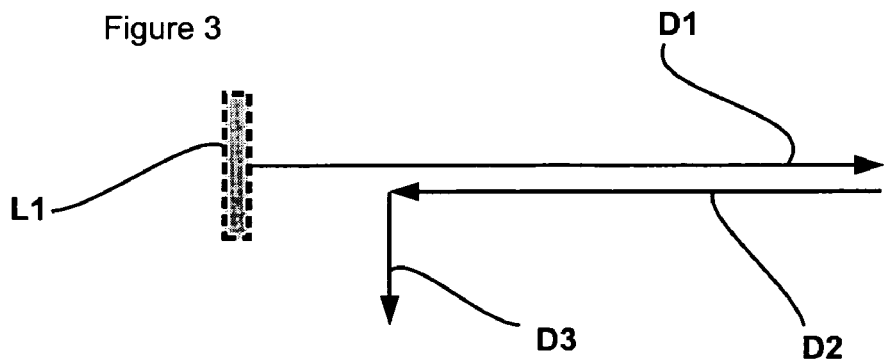
FIG. 3 demonstrates the complete and total optical path length dimensions of the first of the two special arrangements.

The total optical path length between imager L1 and output 20 for assemblage 49 is shown in FIG. 3 as: D1+D2+D3.

Figure 5:
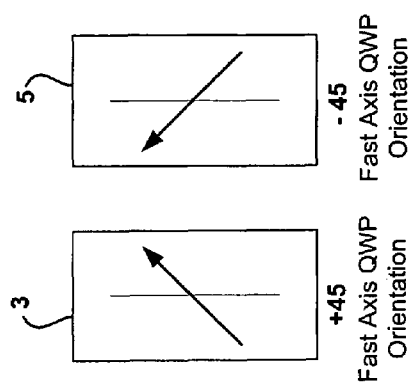
FIG. 5 illustrates the rotational orientation of the two quarter-wave plates 3 and 5 relative to the vertical axis of the three-imager engine, showing that they are oriented in opposite sense.
Figure 4:
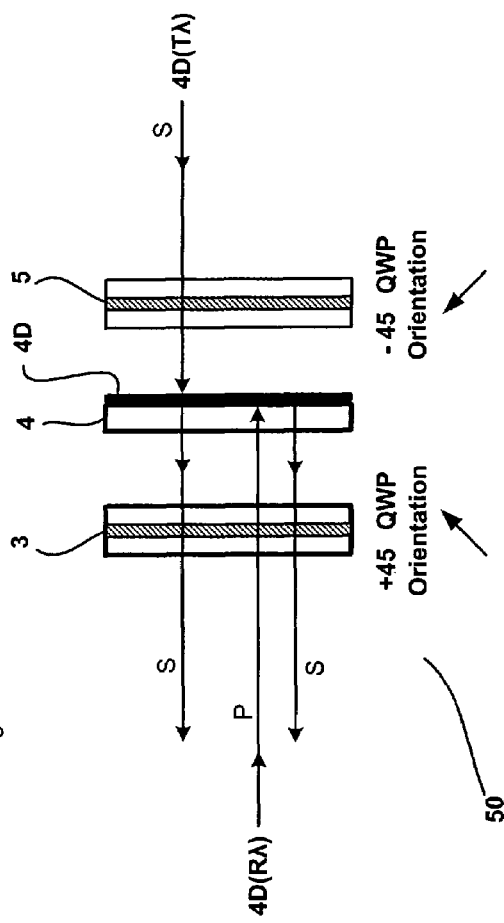
FIG. 4 illustrates the second of the component arrangements for the three-imager imaging stage. This second arrangement 50 acts essentially as a separation management barrier. This second arrangement 50 processes light input into both Color Channel A and Color Channel B.
Figure 7:
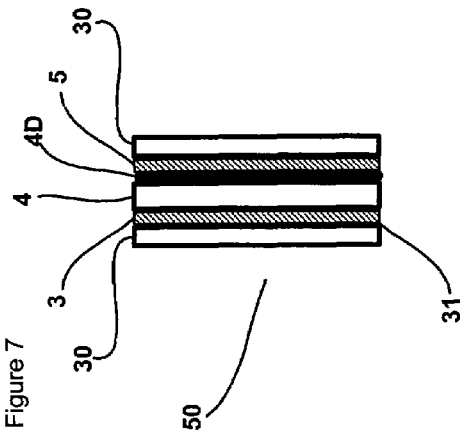
FIG. 7 demonstrates that this optically cemented arrangement produces a single, solid separation management barrier component 50.

The second of the two special arrangements 50 comprising the imaging stage 60 is shown in FIG. 4, which illustrates that assemblage 50 acts essentially as a separation management barrier. This arrangement processes light that is simultaneously input into both Color Channel A and Color Channel B. Relevant to the combined effect of QWP 3, dichroic mirror 4 and QWP 5, FIG. 5 illustrates the rotational orientation of the QWP 3 and QWP 5 relative to the vertical axis of the three-imager engine, showing that their fast birefringent axes are oriented in opposite sense.

Taken as a set shown in FIG. 4, QWP 3, dichroic mirror 4 and QWP 5 exhibit the function of a polarization and color separation barrier, which creates a complete imaging stage.

In assemblage 50 shown in FIG. 4, the spectral pass-band defined by dichroic coating 4D produces the separation function such that in the forward direction (which is illustrated as being from left to right in FIG. 4), P polarized light spectra R$\lambda$ input to three-imager imaging stage 60 through Color Channel A is retro-reflected and simultaneously polarization-switched to S polarized light at barrier dichroic 4D and returning in the reverse direction. The P polarized R$\lambda$ is switched to S polarization due to the double pass through QWP 3. However, in the reverse direction (illustrated as being from right to left), the S polarized supplemental light spectra T$\lambda$ from Color Channel B first encounters QWP 5, which at −45° rotation is oppositely oriented to QWP 3 at +45°, so that after T$\lambda$ transmits through barrier dichroic 4D it remains in its original S polarized state because its eventual transmission through QWP 3 nulls the retardance first added by QWP 5.

The result of the interaction between assemblage 50 and the two oppositely traveling supplemental spectra beams R$\lambda$ and T$\lambda$ is two axially congruent, parallel beams traveling in the same direction (right to left), both of which are in the pure S polarized state.

Figure 6:
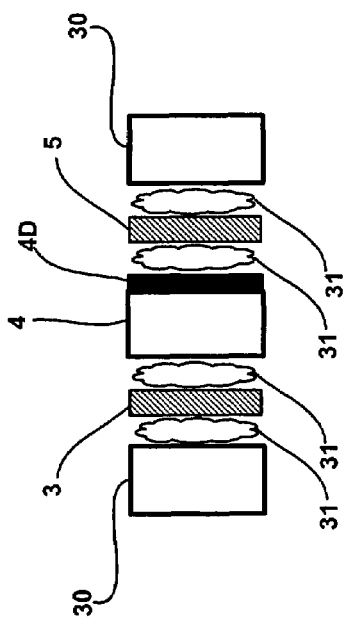
FIG. 6 depicts an optional variation of the physical embodiment of the second arrangement 50. The individual separation management barrier components 3, 4 and 5 shown in FIG. 4 operating with air between them, can also be coupled together using optical cement 31 and a lesser number of glass carrier substrates 30.

FIG. 4 shows the assemblage of QWP 3, dichroic mirror 4 and QWP 5 operating in air. FIG. 6 shows that QWP 3, QWP 5, and dichroic mirror 4 comprising second assemblage 50 can also be bonded together into one single composite component via the addition of clear optical cement or adhesive layers 31 that serve to optically couple the components. The total number of glass end-caps 30, which are inert to the optical function, is usually reduced in the composite assemblage 50 shown in FIG. 7. Particular bonding and combining methods are well known in the art and need not be discussed further.

The polarization logic path of Color Channel B is depicted in FIG. 8 for the three-imager design 60. LCoS imagers L2 and L3 are positioned on adjacent sides of PBS cube 7 such that they are in perpendicular planes. Note that as used herein, the term "adjacent" is not limited to any form of direct attachment. Thus, all the term adjacent connotes is that components are arranged such that they are next to each other. The term "adjacent" does not foreclose the possibility that components stated as "adjacent" to each other may have other components located in between them. Two identical wavelength selective retarder components 6a and 6b are positioned on the two adjacent sides of PBS cube 7 opposite to the imagers. Retarder 6a is substantially parallel to LCoS imager L3 while retarder 6b is substantially parallel with LCoS imager L2. This assemblage 60 is positioned as shown in FIG. 8 along the single axis of the completed imaging stage.

P polarized light with a particular color spectrum in Color Channel B from illumination stage 80 (discussed below) enters the imaging stage through input 11. Depending on the color spectrum chosen by the designer to occupy Color Channel B by specification of illumination stage dichroic mirrors 16 and 18 and dichroic mirror coating 4D, wavelength selective retarder 6a switches to S polarization a portion of the spectrum of the light beam from Color Channel B incident to PBS 7. At the hypotenuse of PBS 7, input beam 11 is separated into its two polarization components, which are also the two color components due to the color-to-polarization encoding action of the wavelength selective retarder 6a. Upon reflection from LCoS imagers L2 and L3, the two separated color beams recombine as they exit PBS 7 and their opposite polarizations are removed via a second wavelength selective retarder 6b.

This color separation and recombination process depicted in FIG. 8 between input point A and exit point B is often referred to as a "color corner."

Once past exit point B, the two return beams from Color Channel B representing image content from imagers L2 and L3 enter the two sequential component arrangements 49 and 50. As described earlier, the return beams emanating from Color Channel B pass through special assemblage 50 unchanged, reaching PBS cube 1 in the S polarization, where they reflect into output beams 21, joining the return beam 20 from Color Channel A. Both output beams 20 and 21 emerge exit PBS cube 1 in the S polarization and have waste light components removed by film polarizer 2, rotated properly for S transmission and P absorption. Projection lens 8 (shown in FIG. 1) magnifies the image onto a projection screen.

In a manner similar to the calculation of total optical path length between imager L1 to the output 20, the total optical path length between imager L2 and output 21 for assemblage 60 is shown in FIG. 9 as: D4+D5.

Similarly, the total optical path length between imager L3 and output 21 for assemblage 60 is shown in FIG. 9 as: D6+D7+D8.

Critical to the quality operation of any multi-imager optical engine is that the optical path length between each imager and its beam output be, within the boundaries of practical tolerances, equal, such that: D1+D2+D3=D4+D5=D6+D7+D8.

This requirement holds true for all multi-imager optical engines. Thus, when building an imaging stage 60 like that disclosed herein, component dimensions much be chosen such that the above relation holds true within the boundaries of practical tolerances.

As listed in the color logic table shown in FIG. 10, any primary color can be designed to operate on any of the LCoS imager ports L1, L2 and L3 by simply changing the response of dichroic mirrors 16 and 18 in the illumination stage 80 (discussed below), and the dichroic mirror 4. Any permutation of color logic assigned to any of the imager ports produces a high quality projected image, although there are minor materials engineering reasons that favor some of the logic arrangements of FIG. 10 over others. Regardless, the imaging stage 60 described herein applies to all color logic arrangements listed in FIG. 10.

The cost of LCoS imagers is a significant factor affecting the overall cost of a display. By reducing the number of LCoS imagers required, the cost of a display can be reduced. Thus, FIGS. 11-20 illustrate a microdisplay imaging stage assemblage for use in Optical Engines using only two LCoS imagers.

Figure 11:
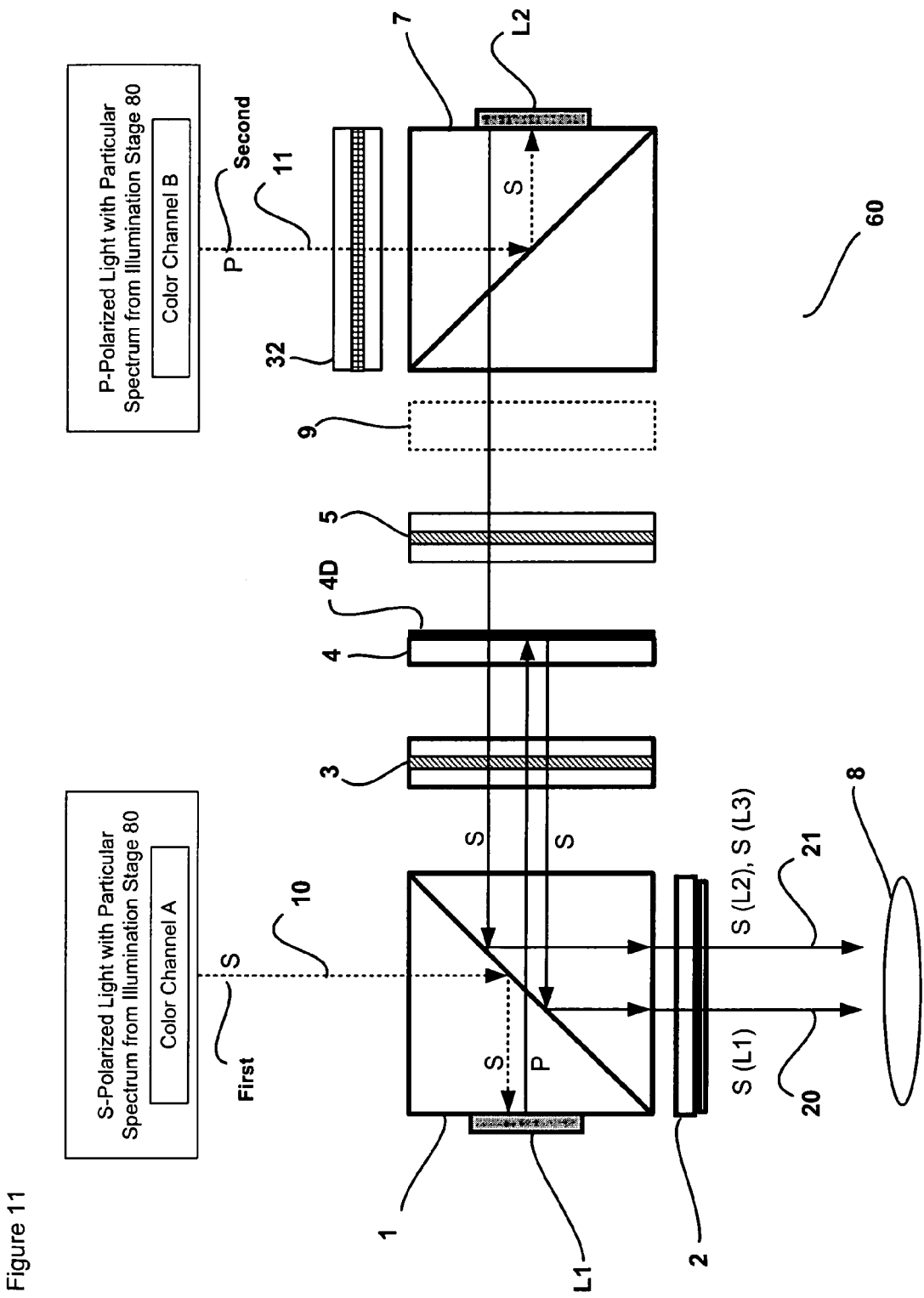
FIG. 11 depicts a two-imager imaging stage design 60 showing illumination stage 80 inputs 10 and 11, outputs 20 and 21, and key polarization logic paths (S polarization and P polarization).

The two-imager imaging stage 60 shown in FIG. 11 utilizes two unique component arrangements, the first such arrangement involving PBS cube 1, film polarizer 2, quarter-wave plate ("QWP") 3 and dichroic mirror 4 and a second arrangement comprising QWP 3, dichroic mirror 4 and QWP 5. Additional optical components comprising common half-wave plate (HWP) 32 and PBS cube 7 creates a complete two-imager LCoS imaging stage that uniquely operates along a single axis subtended between imager components L1 and L2 that are substantially facing each other.

The two imager imaging stage is similar to the three imager imaging stage described above. However, there are differences. First, there are only two physical imagers, L1 and L2, in the two imager imaging stage. Imagers L1 and L2 are positioned at only two imager ports (rather than three ports in the three-imager design). Only one side of PBS cube 7 has an imager disposed thereon. In particular, imager L2 is disposed on PBS cube 7 such that its active area is in the same axis as imager L1. This can be seen in FIG. 11.

Figure 15:
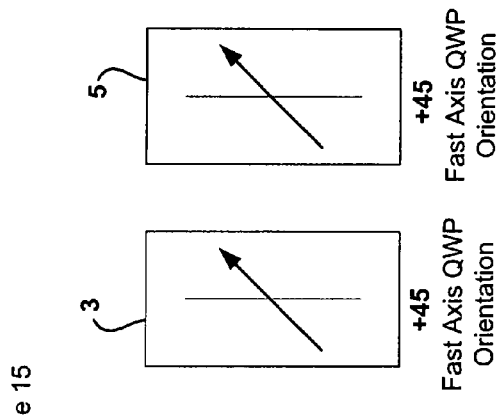
FIG. 15 illustrates the rotational orientation of the two quarter-wave plates 3 and 5 relative to the vertical axis of the two-imager engine, showing that they are oriented in identical sense.
Figure 14:
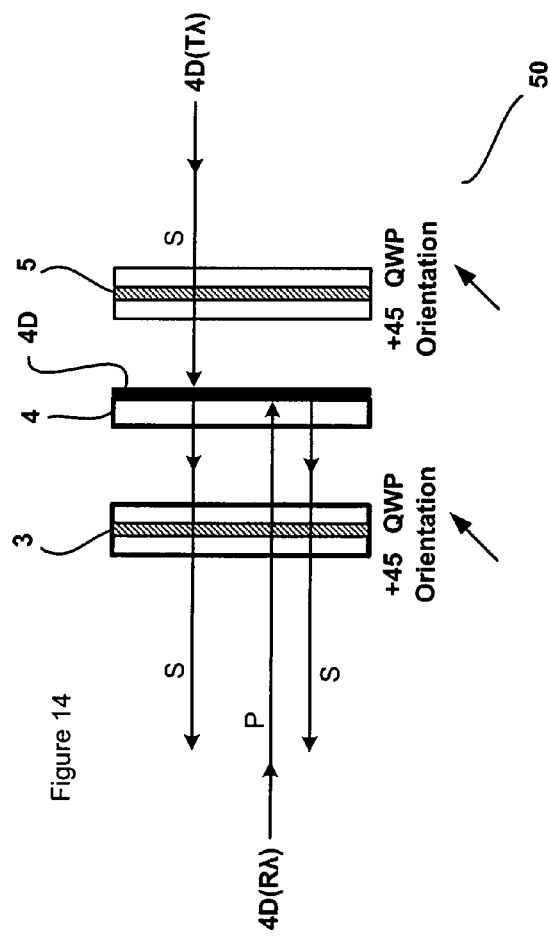
FIG. 14 illustrates the second of the two arrangements for the two-imager imaging stage design that acts essentially as a separation management barrier. This second arrangement 50 processes light input into both Color Channel A and Color Channel B.

Another difference between the two imager and three imager imaging stages is that the orientation of QWP 3 and QWP 5 are identical in the two-imager imaging stage (rather than in opposite orientation as they are in the three-imager imaging stage). Instead of +45° and −45° rotation as in the three-imager imaging stage, the two quarter-wave plates used in the two-imager imaging stage operate at +45° and +45° in the two-imager design. This is shown in FIG. 14 and FIG. 15.

Since imager L3 has been removed from the two-imager design, color separation in PBS 7 is no longer necessary. Wavelength selecting retarder 6a is therefore replaced by a common half-wave plate (HWP) 32. Color recombining is also not necessary in the two-imager imaging stage. Therefore the second wavelength selecting retarder 6b is removed. This is shown in FIG. 11 and FIG. 18.

Optional dummy glass spacer 9 can be substituted in the optical position formally filled by the second wavelength selective retarder 6b. Spacer 9 merely compensates for the missing glass path length formerly occupied by retarder 6b and thus allows all other component thicknesses to be the same in both the three-imager and two-imager assemblies during production. It is important to note that spacer 9 is an optional component, as it does not affect function. This is shown in FIG. 11 and FIG. 18.

Figure 22:
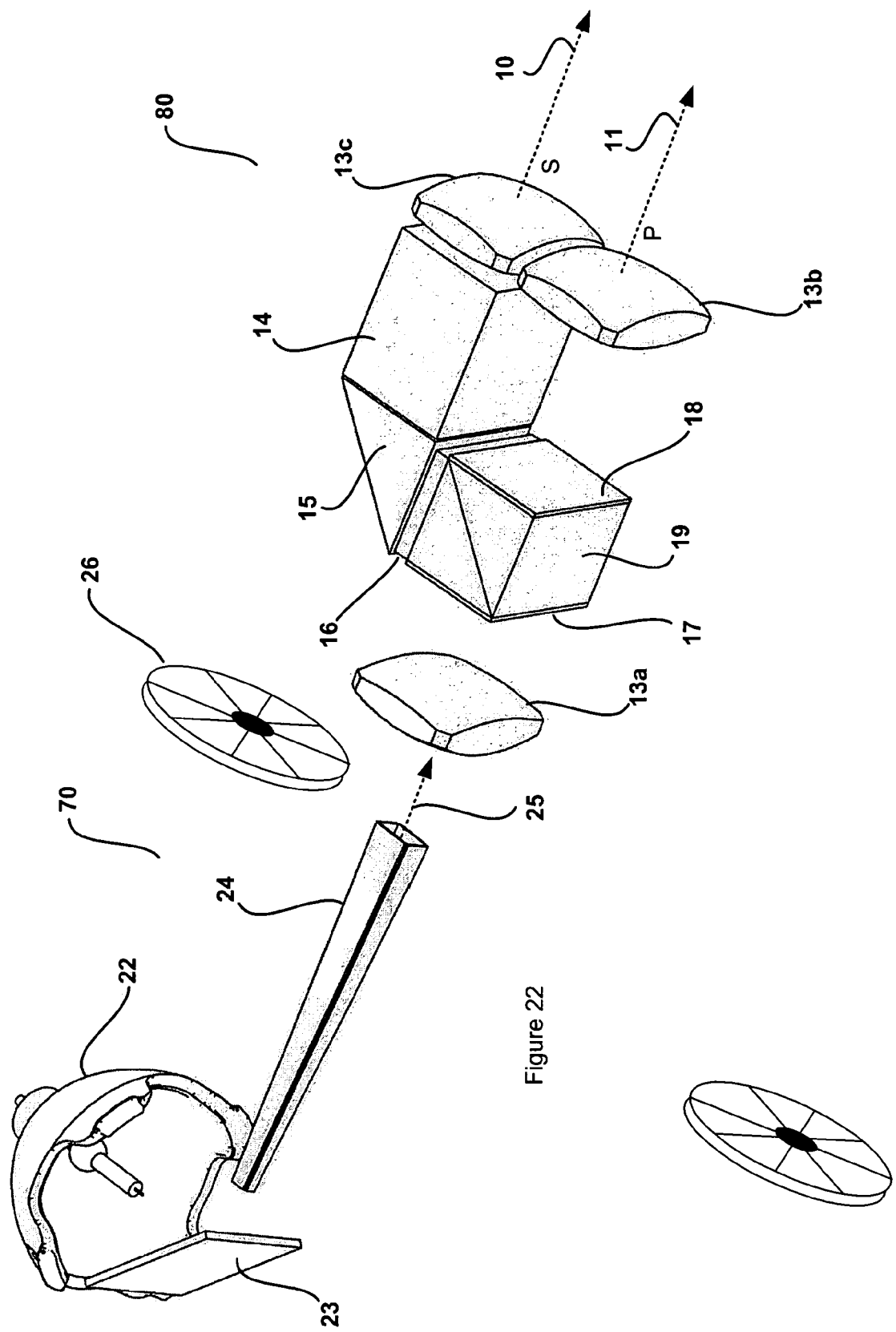
FIG. 22 depicts a typical collection stage 70 that with output 25 leading to input 25 of the illuminator 80. Optional color switch 26 is used only in the two-imager design variant engine.

An electronic or electromechanical color switch 26 is added to the illumination stage 80 (see FIG. 22). When illumination stage 80 utilizes color switch 26, the illumination stage delivers constant color output into Color Channel A, and sequential output into Color Channel B. These faster-than-the-eye switches are commonly dichroic "color wheels" attached to small electromechanical servomotors manufactured in high volume for commercial field sequential optical engines. Purely electronic color switches also are available. An illustrative color switch 26 is shown in FIG. 22.

Referring to FIG. 11, the complete imaging stage 60 for the two-imager imaging stage is shown, which depicts illumination stage 80 inputs 10 and 11, outputs 20 and 21, and basic polarization logic paths (S polarization and P polarization). As stated, imager L3 has been eliminated, HWP 32 is placed at the position formerly occupied by wavelength selective retarder 6*a*, and optional glass spacer 9 has replaced the second wavelength selective retarder 6*b*. All other components in the two-imager imaging stage are the same as in the three-imager imaging stage.

Figure 12:
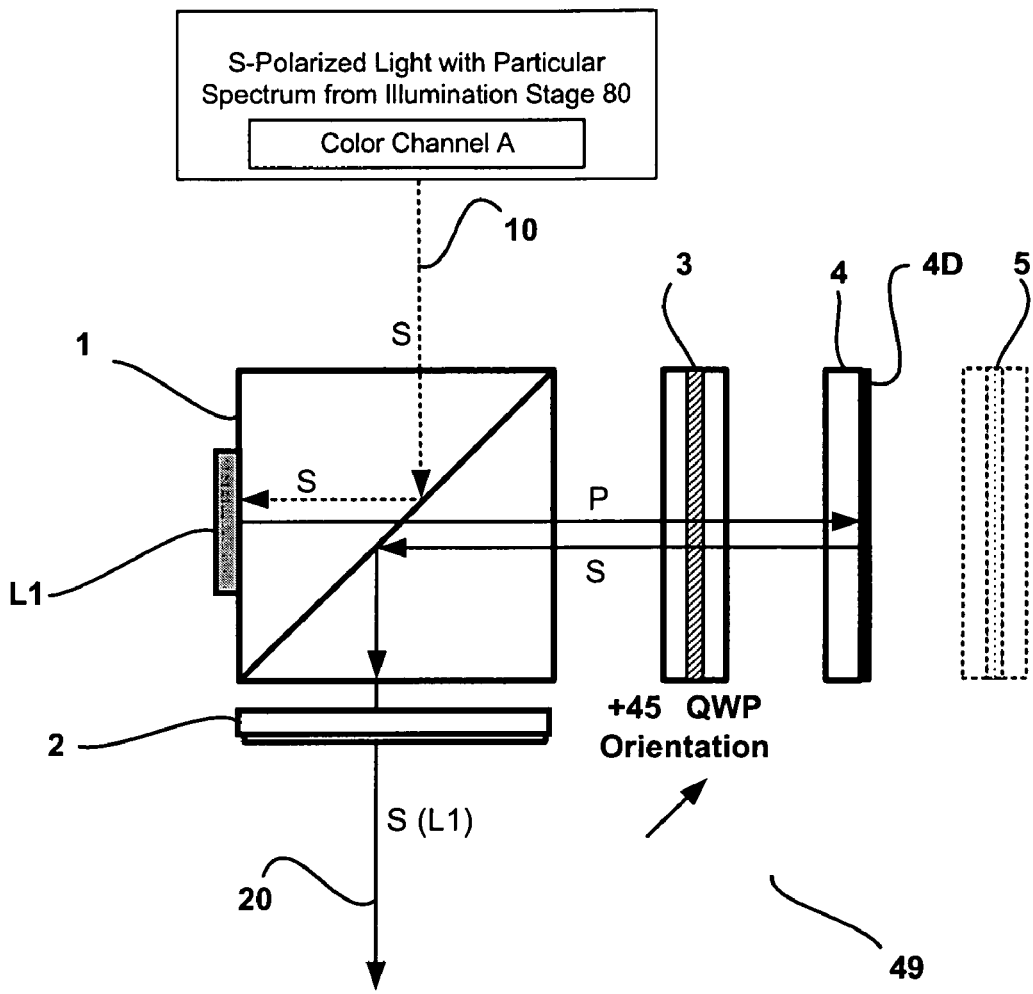
FIG. 12 details the first of the two component arrangements for the two-imager imaging stage design. This first arrangement 49 processes only the light input 10 entering Color Channel A.
Figure 13:
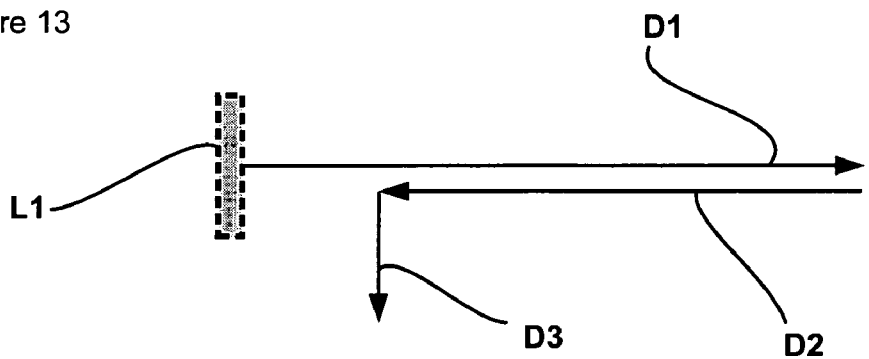
FIG. 13 dimensions the complete and total optical path lengths of the first of the two arrangements for the two-imager imaging stage design.

The formerly described disclosure of an arrangement of components comprising the first assemblage 49 of the complete imaging stage 60 as it applies to the three-imager optical engine also applies in full to the two-imager optical engine as depicted in FIG. 12. In fact, the structure and function of first assemblage 49 is independent of the whether it is used in the three-imager or two-imager variant, including the total path length depicted in FIG. 13. In particular, first assemblage 49 of the two imager imaging stage operates as follows. LCoS imager L1 is positioned on a particular side of PBS cube 1 as shown in FIG. 12. LCoS imager L1 is preferably arranged so that its active area is placed along the same axis as LCoS imager L2 (see e.g., FIG. 11). An input beam 10 from color channel A comprising S polarized light of a particular primary color spectrum enters PBS cube 1. Input beam 10 should be suitable to adequately illuminate the active area of LCoS imager L1. When input beam 10, which comprises S polarized light, enters PBS cube 10, it is reflected off of the hypotenuse of PBS cube 1 so that it falls incident upon LCoS imager L1. Thus, when S polarized light reflected from they hypotenuse of PBS cube 1 strikes LCoS imager L1, LCoS imager L1 reflects P polarized light comprising the projected image content. Since the light beam reflected by LCoS imager L1 has P polarization, it is transmitted through the hypotenuse of PBS cube 1, falling incident upon QWP 3. QWP 3 is oriented with its fast axis at +45° to the vertical polarization axis of the beam, thereby providing only half the phase retardance required to switch the linear polarization beam 10 passing through it. After exiting QWP 3, beam 10 then encounters dichroic mirror 4, which is preferably coated with dichroic thin film transmission spectrum formula 4D.

Dichroic mirror thin film coating 4D on dichroic mirror 4 reflects the complete color spectrum found in Color Channel A. Since dichroic mirror 4 is positioned at 0° to the incident beam, its performance in separating the transmission and reflection color bands can be very precise and independent of polarization state.

As seen in FIG. 12, upon retro-reflection from dichroic mirror 4, the complete Color Channel A waveband contained in beam 10 returns to PBS cube 1 via a second transmission through QWP 3. Its +45° orientation adds the second half of the phase retardance suitable to switch the linear polarization from P back to S so that when beam 10 returns to PBS cube 1, it now reflects off the hypotenuse as S polarized output beam 20. Aligned with S polarization output beam 20 is film polarizer 2, the function of which is to trim unwanted P state pollution in the S output, essentially "cleaning up" the pure S polarization in the image from imager L1.

The second of the two special arrangements 50 comprising the two-imager imaging stage 60 is shown in FIG. 14. FIG. 14 illustrates that in the case of the two-imager variant, assemblage 50 also acts essentially as a separation management barrier. This second of the special arrangements processes light that is simultaneously input into both Color Channel A and Color Channel B. However, since the two-imager variant engine requires no polarization-based color separation and recombination functions in Color Channel B as is required by the three-imager engine, one switching function has been eliminated and thus FIG. 15 illustrates that the fast birefringent axis rotational orientation of QWP 3 and QWP 5 relative to the vertical axis of the two-imager engine are in identical sense.

Taken as a set (and as shown in FIG. 14), QWP 3, dichroic mirror 4 and QWP 5 in the two imager imaging stage exhibit the function of a polarization and color separation barrier, a concept pertinent to the teachings herein, as it enables the complete imaging stage in both design variants.

Figure 17:
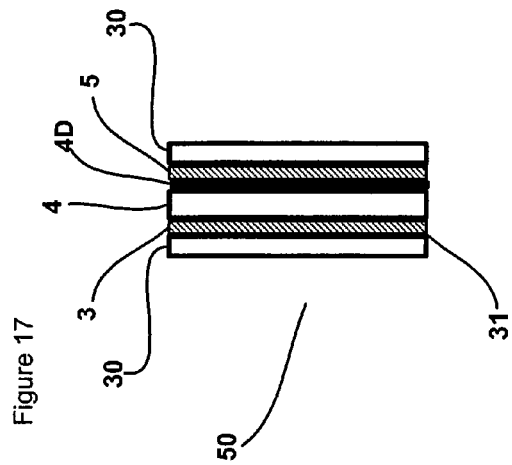
FIG. 17 demonstrates that this optically cemented arrangement produces a single, solid separation management barrier component 50.
Figure 16:
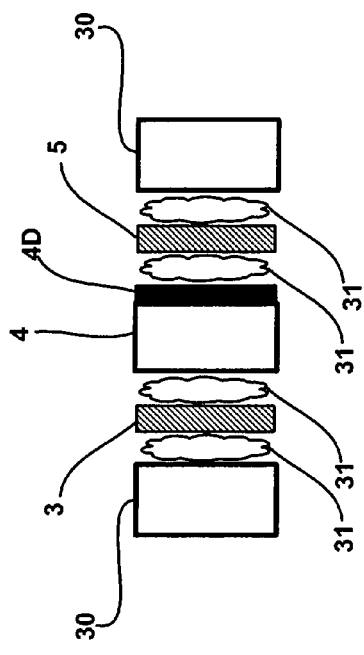
FIG. 16 depicts an optional variation of the physical embodiment of the second special arrangement 50. The individual separation management barrier components 3, 4 and 5 shown in FIG. 4 operating with air between them, can also be coupled together using optical cement 31 and a lesser number of glass carrier substrates 30.

FIG. 14 shows the assemblage of QWP 3, dichroic mirror 4 and QWP 5 operating in air. FIG. 16 and FIG. 17 simply teach that QWP 3, dichroic mirror 4 and QWP 5 comprising second assemblage 50 can also be bonded together into one single composite component via in precisely the same manner as in the three-imager engine.

The two-imager imaging stage polarization logic path of Color Channel B is depicted in FIG. 18. LCoS imager L2 is positioned on one side of PBS 7 such that its active area is in substantially the same axis as the active area of LCoS imager L1. HWP 32 is positioned on the input side of PBS cube 7 adjacent to imager L2 but in a plane perpendicular thereto. This assemblage is positioned as shown in FIG. 18 along the single axis of the completed imaging stage juxtaposed beside the second special arrangement 50, terminating the optical train.

The full and complete color spectrum incident to HWP 32 varies with time in the two-imager variant due to the faster-than-the-eye color field sequential operation provided by color switch 26 (seen in FIG. 22). Still referring to FIG. 18, P polarized light with a particular color spectrum in Color Channel B from illumination stage 80 enters the imaging stage through input 11. Depending on the color spectrum chosen to occupy Color Channel B by transmission specification of illumination stage, dichroic mirrors 16 and 18 (seen if FIGS. 21-22) and dichroic mirror coating 4D, HWP 32 switches to S polarization the full and complete spectrum incident to PBS cube 7. Since the beam is switched sequentially between two colors by color switch 26, the same process quickly alternates between two colors.

At the hypotenuse of PBS cube 7, S polarized input beam 11 is reflected incident onto imager L2 and reflected back through the hypotenuse of PBS cube 7 as P polarization. Once past exit point B, the single sequential color return beam from Color Channel B carrying image content from imager L2 in two primary colors, enters the two special component arrangements 49 and 50 comprising the two-imager imaging stage 60. Beyond point B, the two-imager imaging engine operates the same way as the three-imager engine. In particular, the return beam emanating from Color Channel B passes through special assemblage 50 unchanged, reaching PBS cube 1 in the S polarization, where they reflect into output beam 21, joining the return beam 20 from Color Channel A. Both output beams 20 and 21 emerge exit PBS cube 1 in the S polarization and have waste light components removed by film polarizer 2, rotated properly for S transmission and P absorption. Projection lens 8 (shown in FIG. 11) magnifies the image onto a projection screen.

The total optical path length between imager L1 to the output 20 is D1+D2+D3, shown in FIG. 12. The total optical path length between imager L2 for assemblage 60 shown in FIG. 19 is D4+D5.

The total optical path length between each imager and its beam output must be, within the boundaries of practical tolerances, precisely equal, such that D1+D2+D3=D4+D5.

The color logic table shown in FIG. 20 has fewer possibilities for the two-imager imaging stage because there is one less imager. Still within these possibilities, any primary color can in principle be designed to operate on any of the LCoS imager ports L1 and L2 by simply changing the response of dichroic mirrors 16 and 18 in the illumination stage 80, and the dichroic mirror 4.

It should be noted that the mercury arc lamps used in most commercial optical engines lack strong red color emission. In engine products using mercury lamps, the continuous L1 imager is preferably assigned to imaging red, and the stronger lamp output in blue and green are sequentially switched on imager L2.

For mercury lamp driven engines, red-continuous color logic is the more significant and preferred embodiment disclosed in these teachings for the two-imager optical engine because of its much higher performance. The differences in performance for various color logic choices in the three-imager engine are significantly less.

Figure 21:
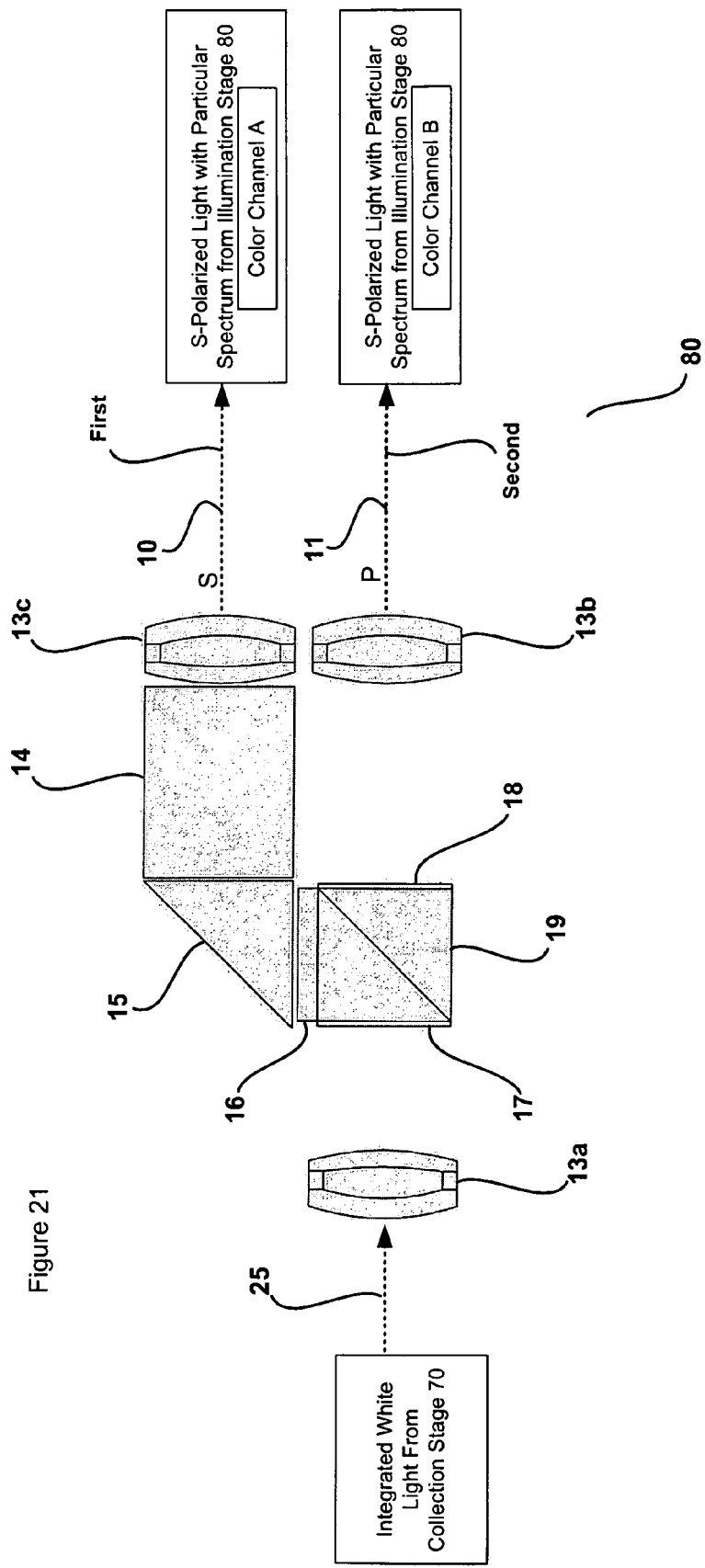
FIG. 21 depicts an illuminator 80 suitable for either a two-imager or three-imager imaging stage design showing illumination stage 80 input 25, and outputs 10 and 11 with polarization (S polarization and P polarization) as shown leading to Color Channel A and Color Channel B.

FIGS. 21-22 disclose a dual output illumination stage 80 matched to the imaging stages described herein. From a standard collection stage apparatus (see FIG. 22), FIG. 21 depicts integrated white light 25 as it is input into the illumination stage 80. Three identical single-element aspheric condenser lenses 13a, 13b and 13c occur at the input and dual output locations 10 and 11. Between the aspheric condenser lenses 13a, 13b and 13c, a condensed field focus region occurs and within this region resides illumination stage components, which preferably comprise glass extension block 14, glass turning prism 15, dichroic mirror 16, optional lamp cleanup dichroic mirror 17, dichroic mirror 18 and PBS cube 19. This special assemblage splits the single axis input 25 into dual parallel beams. One beam supplies illumination stage output 10 with an S polarized beam of color spectrum defined by Color Channel A suitable to deliver a focus of light onto imager L1, while the second beam supplies illumination stage output 11 with a P polarized beam of color spectrum defined by Color Channel B suitable to deliver a focus of light onto imager(s) L2 and, in the three imager imaging stage, L3.

Continuing to refer to FIG. 21, after passing through entrance condenser lens 13a, the full input beam 25 is cleaned of remaining deleterious light output from the arc lamp via optional lamp cleanup dichroic mirror 17. One possible use for this optional filter is removal of the image polluting yellow spectral line from a mercury lamp. PBS cube 19 then splits the incident light into two beams, one of S polarization, one of P polarization. The S polarization beam passes through dichroic mirror 16 with the Color Channel A transmission spectrum specification, while the P polarization beam passes through dichroic mirror 18 with the Color Channel B spectrum transmission specification.

After dichroic mirror 18, the P polarization beam continues through air to the exit condenser lens 13b, becoming focused illumination stage output beam 111 in Color Channel B.

After dichroic mirror 16, the S polarization beam continues through glass turning prism 15 and glass extension block 14 to the exit condenser lens 13c, becoming a focused illumination stage output beam 10 in Color Channel A. Turning prism 15 and extension block 14 are used to parallelize and balance the two optical paths such that S polarization output 10 and P polarization output 11 are congruent and a specified distance apart suitable to illuminate the geometry of the imaging stage. The particular indexes and sizes of the path correction pieces 16, 15 and 14 can be calculated using methods well known in the optics trade.

FIG. 22 depicts a typical light collection stage 70 with illumination stage 80. Many standard arrangements can be used as a collection stage. An ideal collection stage should be complete with lamp and reflector module 22, cold mirror 23 for removing deleterious lamp emissions, and tapered integration stick 24 for homogenizing the beam and transforming the light source's angular space to the desired numerical aperture.

Also depicted in FIG. 22 is the optional color switch used for the two-imager imaging stage, shown as color wheel 26. Purely electronic filter color switches can also be used. The color switching component can reside in any practical position in either the collection and illumination stages. The position of color wheel 26 shown in FIG. 22 is supplied only as a reference.

Alternate embodiments can be constructed through the changing of polarization logic while still maintaining the fundamental teachings of the designs disclosed herein. The teachings are to be taken as independent of the particular polarization or color logic. Color Logic is outlined in FIG. 10 and FIG. 20. FIG. 23 lists polarization logic of the preferred embodiment along with two other examples of alternate polarization logic. There are other sets of polarization logic beyond the examples given.

Thus, a preferred image projector engine architecture has been described. While embodiments and applications of image projector engine architecture have been shown and described, as would be apparent to those skilled in the art, many more embodiments and applications are possible without departing from the inventive concepts disclosed herein.

What is claimed is:

1. An optical engine for projecting images comprising:
    a first PBS cube having a first beamsplitting hypotenuse that reflects first polarization state light beams and transmits second polarization state light beams, said first PBS cube having a first face for receiving first polarization state, first color spectrum light beams transmitted along a first optical axis;
    a first imaging device placed at a second face of said first PBS cube, for receiving first color spectrum, first polarization state light beams reflected by said first beamsplitting hypotenuse and reflecting first color spectrum, second polarization state light beams having pixel information provided by said first imaging device along a second optical axis towards a fourth face of said first PBS cube, said fourth face of said first PBS cube opposite said second face of said first PBS cube, said first optical axis and said second optical axis being perpendicular to each other;
    a first quarter-wave plate residing in a plane perpendicular to said second optical axis, said first quarter-wave plate providing half of the phase retardance required for a complete switch of polarization state for polarized light beams passing therethrough along said second optical axis, said first quarter wave plate also providing another half phase retardance resulting in a complete switch of polarization state for polarized beams returning therethrough upon reflection from a dichroic mirror;

said dichroic mirror residing in a plane perpendicular to said second optical axis and having a first face and a second face, said first face of said dichroic mirror facing said first quarter-wave plate, said dichroic mirror reflecting light having said first color spectrum and transmits light having a second color spectrum;

a second quarter-wave plate residing in a plane perpendicular to said second optical axis that removes half the phase retardance required for a complete switch of polarization state for polarized light beams passing therethrough along said second optical axis, said dichroic mirror residing in between said second quarter-wave plate and said first quarter-wave plate; and a film polarizer disposed at a third face of said first PBS cube and perpendicular to said first optical axis, said film polarizer transmitting light beams having said first polarization state and absorbing light beams having said second polarization state.

2. The optical engine of claim 1 wherein a projection lens receives the output of said film polarizer.

3. The optical engine of claim 2 wherein a first light beam reflected by said first imaging device, passing through said first beamsplitting hypotenuse, transmitted through said first quarter-wave plate in a first direction along said second optical axis, reflected back towards said first quarter-wave plate by said dichroic mirror in a second direction along said second optical axis, transmitted back through said first quarter-wave plate, transmitted back into said first PBS cube, reflected by said first beamsplitting hypotenuse towards said third face of said first PBS cube, and transmitted through said film polarizer to said projection lens has a first path length.

4. The optical engine of claim 3 further comprising:

first wavelength selective retarder for receiving second polarization state, second color spectrum light beams transmitted along a third optical axis, said first wavelength selective retarder being perpendicular to said third optical axis and switching a portion of the second color spectrum to the first polarization state;

a second PBS cube having a first face in a plane perpendicular to said third optical axis and having a second beamsplitting hypotenuse that reflects light beams having the first polarization state and transmits light beams having the second polarization state;

a second imaging device placed at a second face of said second PBS cube for receiving first polarization state light beams reflected by said second beamsplitting hypotenuse, said second face of said second PBS cube being perpendicular to said first face of said second PBS cube, said second imaging device reflecting second polarization state light beams having pixel information provided by the second imaging device along said second optical axis;

a third imaging device placed at a third face of said second PBS cube for receiving the second polarization state light beams transmitted by said second beamsplitting hypotenuse and reflecting first polarization state light beams having pixel information provided by the third imaging device along the third optical axis; and a second wavelength selective retarder placed at a fourth face of said second PBS cube such that said second wavelength selective retarder is placed in between said second PBS cube and said second quarter-wave plate.

5. The optical engine of claim 4 wherein a second light beam reflected by said second imaging device along said second optical axis, passing through said second beamsplitting hypotenuse, transmitted by said second wavelength selective retarder, transmitted through said second quarter-wave retarder, transmitted through said dichroic mirror, transmitted through said first quarter-wave plate, transmitted into said first PBS cube, reflected by said first beamsplitting hypotenuse towards said third face of said first PBS cube, and transmitted through said film polarizer to said projection lens has a second path length, said second path length being substantially identical to said first path length.

6. The optical engine of claim 5 wherein a third light beam reflected by said third imaging device along said third optical axis, reflected by said second beamsplitting hypotenuse along said second optical axis in a direction opposite said second imaging device, transmitted by said second wavelength selective retarder, transmitted through said second quarter-wave retarder, transmitted through said dichroic mirror, transmitted through said first quarter-wave plate, transmitted into said first PBS cube, reflected by said first beamsplitting hypotenuse towards said third face of said first PBS cube, and transmitted through said film polarizer to said projection lens has a third path length, said third path length being substantially identical to said first path length.

7. The optical engine of claim 3 further comprising:

a half-wave plate for receiving second polarization state, second color spectrum light beams transmitted along a third optical axis, said half-wave plate being perpendicular to said third optical axis and switching second polarization state light beams to the first polarization state;

a second PBS cube having a first face in a plane perpendicular to said third optical axis and having a second beamsplitting hypotenuse that reflects light beams having the first polarization state and transmits light beams having the second polarization state, said second PBS cube is arranged such that it is adjacent to said second quarter-wave plate; and a second imaging device placed at a second face of said second PBS cube for receiving first polarization state light beams reflected by said second beamsplitting hypotenuse, said second face of said second PBS cube being perpendicular to said first face of said second PBS cube, said second imaging device reflecting second polarization state light beams having pixel information provided by the second imaging device along said second optical axis.

8. The optical engine of claim 7 wherein a second light beam reflected by said second imaging device along said second optical axis, passing through said second beamsplitting hypotenuse, transmitted through said second quarter-wave retarder, transmitted through said dichroic mirror, transmitted through said first quarter-wave plate, transmitted into said first PBS cube, reflected by said first beamsplitting hypotenuse towards said third face of said first PBS cube, and transmitted through said film polarizer to said projection lens has a second path length, said second path length being substantially identical to said first path length.

9. The optical engine of claim 8 further comprising an optical spacer device disposed in between said second PBS cube and said second quarter-wave plate, said optical spacer device sized to ensure that said second path length is substantially identical to said first path length.

10. The optical engine of claim 1 wherein said first imaging device comprises a liquid crystal on silicon microdisplay device.

11. The optical engine of claim 1 wherein said dichroic mirror having a dichroic thin film transmission spectrum formula coating on said second face thereof.

12. The optical engine of claim 1 wherein said first color spectrum comprises a primary color spectrum and second color spectrum comprises a supplemental color spectrum, said supplemental color spectrum comprises those color wavelengths not included in said primary color spectrum.

13. An imaging engine structure that receives a first color spectrum light beam along a first optical axis, the first color spectrum light beam initially having a first polarization state, comprising:
- a first polarizing beamsplitter (PBS) cube positioned to receive the first color spectrum light beam at a first face thereof, said first PBS cube comprising a first beamsplitting hypotenuse that reflects first polarization state light beams along a second optical axis and transmits second polarization state light beams along the first optical axis, said first beamsplitting hypotenuse thereby reflecting the first color spectrum light beam;
- a first imaging device affixed to a second face of said first PBS cube, said first imaging device being in a plane perpendicular and incident to said second optical axis, said first imaging device reflecting the first color spectrum beam back along said second optical axis such that the first color spectrum beam contains pixel information and has its polarization twisted to the second polarization state;
- a first quarter-wave plate residing in a plane perpendicular to said third optical axis and positioned to be adjacent a third face of said first PBS cube, said third face of said first PBS cube being face opposite said second face, said first quarter-wave plate providing half phase retardance required for a complete switch of polarization state on the first color spectrum light beam passing therethrough;
- a dichroic mirror residing in a plane perpendicular to said second optical axis and having a first face and a second face, said first face of said dichroic mirror facing said first quarter-wave plate, said dichroic mirror reflecting the first color spectrum beam such that said first color spectrum beam is transmitted back through said first quarter-wave retarder, thereby providing another half phase retardance resulting in a complete switch of polarization state for the first color spectrum light beam returning therethrough upon reflection from said dichroic mirror, the first color spectrum beam traveling from said first quarter-wave plate and being reflected by said first beamsplitting hypotenuse;
- a film polarizer disposed at a fourth face of said first PBS cube and perpendicular to said first optical axis, said film polarizer transmitting the first color spectrum light beam; and
- a projection lens positioned adjacent to said film polarizer such that said first light beam has a first path length between said first imaging device and said projection lens.

14. The imaging engine structure of claim 13 that further receives a second color spectrum light beam along a third optical axis, the second color spectrum light beam initially having a second polarization state, comprising:
- a first wavelength selective retarder positioned perpendicular to the second color spectrum light beam, said first wavelength selective retarder switching a portion of color spectrum comprising the second color spectrum light beam from the second polarization state to the first polarization state, the second color spectrum light beam thereafter comprising a first sub color spectrum light beam initially having the first polarization state, and a second sub-color light beam initially having the second polarization state;
- a second PBS cube positioned to receive said first sub color spectrum light beam and said second sub color spectrum light beam at a first face thereof, said second PBS cube comprising a second beamsplitting hypotenuse that reflects light beams having the first polarization state along the second optical axis and transmits light beams having the second polarization state along said third optical axis, said second beamsplitting hypotenuse thereby reflecting said first sub color spectrum light beam along said second optical axis and transmitting said second sub color spectrum light beam along said third optical axis;
- a second imaging device affixed to a second face of said second PBS cube, said second imaging device being in a plane perpendicular and incident to the second optical axis, said second imaging device having incident thereupon said first sub color spectrum light beam and reflecting it such that it contains pixel information and has its polarization twisted to the second polarization state;
- a third imaging device affixed to a third face of said second PBS cube, said third imaging device being in a plane perpendicular and incident to the third optical axis, said third imaging device having incident thereupon said second sub color spectrum light beam and reflecting it such that it contains pixel information and has its polarization twisted to the first polarization state;
- a second wavelength selective retarder placed at a fourth face of said second PBS cube such that said second wavelength selective retarder is placed in between said second PBS cube and said second quarter-wave plate, said second wavelength selective retarder switching said first sub color spectrum light beam to the first polarization state and recombining said first sub color spectrum light beam and said second sub color spectrum light beam into the second color spectrum light beam; and
- a second quarter-wave plate residing in a plane perpendicular to said second optical axis, adjacent to said second wavelength selective retarder and positioned such that said dichroic mirror resides in between said first quarter-wave plate and said second quarter-wave plate, said second quarter-wave plate providing half phase retardance for polarized light beams passing therethrough.

15. The imaging engine structure of claim 14 wherein said first sub color spectrum light beam has a second path length between said second imaging device and said projection lens, and said second sub color spectrum light beam has a third path length between said third imaging device and said projection lens.

16. The imaging structure of claim 15 where in said first path length, said second path length and said third path length have substantially identical lengths.

17. The optical engine of claim 16 further comprising an optical spacer device disposed in between said second PBS cube and said second quarter-wave plate, said optical spacer device having sufficient thickness to ensure that said second path length and said third path length is substantially identical to said first path length.

18. The optical engine of claim 13 wherein said first imaging device comprises a liquid crystal on silicon microdisplay device.

19. The optical engine of claim 13 wherein said dichroic mirror having a dichroic thin film transmission spectrum formula coating on said second face thereof.

20. The optical engine of claim 14 wherein said first color spectrum comprises a primary color spectrum and second color spectrum comprises a supplemental color spectrum, said supplemental color spectrum comprises those color wavelengths not included in said primary color spectrum.

21. The imaging engine structure of claim 13 that receives a switching color spectrum light beam along a third optical axis, the switching color spectrum light beam initially having a second polarization state, comprising:
 a half-wave plate positioned perpendicular to the switching color spectrum light beam, said half-wave plate being perpendicular to said third optical axis and twisting the switching color spectrum light beam to the first polarization state;
 a second PBS cube positioned to receive the switching color spectrum light beam at a first face thereof and having a second beamsplitting hypotenuse that reflects light beams having the first polarization state and transmits light beams having the second polarization state, said second PBS cube is arranged such that it is adjacent to said second quarter-wave plate;
 a second imaging device placed at a second face of said second PBS cube for receiving the switching color spectrum light beam reflected by said second beamsplitting hypotenuse, said second face of said second PBS cube being perpendicular to said first face of said second PBS cube, said second imaging device reflecting, along said second optical axis, the switching color spectrum light beam such that it has pixel information and is twisted to the second polarization state; and
 a second quarter-wave plate residing in a plane perpendicular to said second optical axis, adjacent to said second PBS cube and positioned such that said dichroic mirror resides in between said first quarter-wave plate and said second quarter-wave plate, said second quarter-wave plate providing half phase retardance for the switching color spectrum light beam passing therethrough.

22. The optical engine of claim 21 wherein the first color spectrum light beam comprises light having a primary color spectrum and the switching color spectrum light beam comprises light alternating between color spectrums that are not included in said primary color spectrum.

23. An imaging apparatus that receives a first color spectrum light beam having a first polarization state along a first optical axis and a second color spectrum light beam having a second polarization state along a second optical axis, the first optical axis and the second optical axis being parallel to each other, comprising:
 a first and a second PBS cube, said first and said second PBS cube having an optical space between them defining a third optical axis, said first PBS cube having a first face that is perpendicular and incident to said first optical axis, said first PBS cube further having a second face opposite said first face of said first PBS cube, said second PBS cube having a first face that is perpendicular and incident to said second optical axis and a fourth face that is opposite said first face of said second PBS cube;
 a first wavelength selective retarder positioned perpendicularly to the second optical axis and adjacent said first face of said second PBS cube;
 a first and a second quarter-wave plate being perpendicular to said third optical axis and disposed between said first and said second PBS cube, said first quarter-wave plate being adjacent a fourth face of said first PBS cube, said fourth face of said first PBS cube being perpendicular to said first face of said first PBS cube, said second quarter-wave plate being adjacent a second face of said second PBS cube, said second face of said second PBS cube being perpendicular to said first face of said second PBS cube;
 a second wavelength selective retarder being perpendicular to the third optical axis and between said second quarter-wave retarder and a second face of said second PBS cube;
 a dichroic mirror being perpendicular to the third optical axis being in between said first and said second quarter-wave plate;
 a polarizer being perpendicular to said first optical axis and being adjacent said second face of said first PBS cube, said second face of said first PBS cube being opposite said first face of said first PBS cube; and
 a lens perpendicular to said first optical axis and adjacent said polarizer.

24. The imaging apparatus of claim 23 further comprising:
 a first imaging device at disposed at a third face of said first PBS cube such that said first imaging device is substantially perpendicular and incident to said third optical axis, said third face of said first PBS cube being opposite said fourth face of said first PBS cube;
 a second imaging device disposed at a third face of said second PBS cube such that said second imaging device is substantially perpendicular and incident to said third optical axis; and
 a third imaging device disposed at said fourth face of said second PBS cube, said third imaging device being perpendicular to said third optical axis.

25. The imaging apparatus of claim 23 further comprising:
 a first imaging device at disposed at a third face of said first PBS cube such that said first imaging device is substantially perpendicular and incident to said third optical axis; and
 a second imaging device disposed at a third face of said second PBS cube such that said second imaging device is substantially perpendicular and incident to said third optical axis.

26. A method for creating an image in a projected image device comprising:
 receiving a first color spectrum light beam having a first polarization state along a first optical axis;
 directing the first color spectrum light beam along a second optical axis onto a first imaging device;
 reflecting back along the second optical axis the first color spectrum light beam such that it contains image content and has the second polarization state;
 using a first quarter wave plate that is incident with the second optical axis, partially switching the first color spectrum light beam from the second polarization state to the first polarization state;
 reflecting the first color spectrum light beam one hundred and eighty degrees;

using the first quarter wave plate, switching any second polarization state light remaining in the first color spectrum light beam to the first polarization state;

reflecting the first color spectrum light beam towards a projection lens;

removing any excess second polarization state light from the first color spectrum light beam.

27. The method of claim 26 wherein the reflecting the first color spectrum light beam one hundred and eighty degrees step is performed by a dichroic mirror.

28. The method of claim 27, further comprising:

receiving a second color spectrum light beam having a second polarization state along a third optical axis;

twisting selected portions of the second color spectrum light beam to the first polarization state to create a first sub color spectrum light beam which has the first polarization state and a second sub color spectrum light beam which has the second polarization state;

directing the first sub color spectrum light beam along the second optical axis onto a second imaging device;

transmitting the second sub color spectrum light beam along the third optical axis onto a third imaging device;

reflecting along the second optical axis, by the second imaging device, the first sub color spectrum light beam such that it contains image content and has the second polarization state;

reflecting along the third optical axis, by the third imaging device, the second sub color spectrum light beam such that it contains image content and has the first polarization state;

directing the second sub color spectrum light beam along the second optical axis in a direction opposite the second imaging device;

twisting the first sub color spectrum light beam to the first polarization state;

recombining the first sub color spectrum light beam and said second sub color spectrum light beam to reform the second color spectrum light beam;

providing half phase retardance for the second color spectrum light beam;

transmitting the second color spectrum light beam through the dichroic mirror;

reversing the half phase retardance applied to the second color spectrum light beam;

directing the second color spectrum light beam towards a projection lens; and removing any excess second polarization state light from the second color spectrum light beam.

29. The method of claim 28 wherein light traveling from the first imaging device to the projection lens traverses a first path length, light traveling from the second imaging device to the projection lens traverses a second path length and light traveling from the third imaging device to the projection lens traverses a third path length.

30. The method of claim 29 wherein the first path length, the second path length and the third path length are substantially identical.

31. The method of claim 27, further comprising:

receiving a switching color spectrum light beam having a second polarization state along a third optical axis;

twisting the switching color spectrum light beam to the first polarization state;

directing the switching color spectrum light beam along the second optical axis onto a second imaging device;

reflecting along the second optical axis, by the second imaging device, the switching color spectrum light beam such that it contains image content and has the second polarization state;

partially twisting the switching color spectrum light beam from the second polarization state to the first polarization state;

transmitting the switching color spectrum light beam through the dichroic mirror;

using the first quarter wave plate, completing the twisting of the switching color spectrum light beam from the second polarization state to the first polarization state;

directing the switching color spectrum light beam towards a projection lens; and removing any excess second polarization state light from the second color spectrum light beam.

32. The method of claim 31 wherein the partially twisting step is performed by a second quarter wave plate.

33. The method of claim 31 wherein first color spectrum light beam traverses a first path length between the first imaging device and the projection lens and the switching color spectrum light beam traverses a second path length between the second imaging device and the projection lens.

34. The method of claim 33 wherein the first path length and the second path length are substantially identical.

* * * * *